(12) United States Patent
Passi et al.

(10) Patent No.: US 12,514,553 B2
(45) Date of Patent: Jan. 6, 2026

(54) METHOD AND APPARATUS FOR MANAGING WAVEFORM DATA AND DELAYS IN A WAVEFORM GENERATOR

(71) Applicant: STMicroelectronics S.r.l., Agrate Brianza (IT)

(72) Inventors: Stefano Passi, Pavia (IT); Marco Viti, Pregnana Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 508 days.

(21) Appl. No.: 17/943,643

(22) Filed: Sep. 13, 2022

(65) Prior Publication Data

US 2024/0081778 A1   Mar. 14, 2024

(51) Int. Cl.
*A61B 8/00*     (2006.01)
*B06B 1/02*     (2006.01)
(Continued)

(52) U.S. Cl.
CPC .......... *A61B 8/4494* (2013.01); *A61B 8/5207* (2013.01); *A61B 8/5292* (2013.01);
(Continued)

(58) Field of Classification Search
CPC ...... G06F 12/00; G06F 3/0668; G06F 1/0321; G06F 12/0802; A61B 8/4494;
(Continued)

(56) References Cited

U.S. PATENT DOCUMENTS 5,714,704 A   2/1998  Suzuki et al.
7,999,578 B2  8/2011  Takahashi et al.
(Continued)

FOREIGN PATENT DOCUMENTS

JP   2005222530 A   8/2005
JP   2005275240 A   10/2005
JP   2010204365 A   9/2010

OTHER PUBLICATIONS

Amauri A Assef et al: "A reconfigurable arbitrary waveform generator using PWM modulation for ultrasound research", Biomedical Engineering Online, Biomed Central Ltd, London, GB, vol. 12, No. 1, Mar. 20, 2013 (Mar. 20, 2013), p. 24, XP021146910, ISSN: 1475-925X, DOI: 10.1186/1475-925X-12-24.

(Continued)

*Primary Examiner* — Lisa M Caputo
*Assistant Examiner* — Christian T Bryant
(74) *Attorney, Agent, or Firm* — Crowe & Dunlevy LLC

(57) ABSTRACT

A signal decode circuit is coupled to a buffer for each signal channel. A memory includes a shared area configured to store waveform data sets, each waveform data set including a sequence of coded waveform values specifying waveform step states. The shared area further stores delay data sets, each delay data set including a digital delay value for each signal channel defining a delay profile. A signal pointer addresses the shared area to read one waveform data set from the memory with the sequence of coded waveform values being selectively loaded into one or more of the buffers. A delay pointer addresses the shared area to read one delay data set from the memory with the digital delay values used to control delayed actuation of the signal decode circuits to decode the sequence of coded waveform values from the buffers and generate waveform signals in accordance with the delay profile.

20 Claims, 10 Drawing Sheets

(51) Int. Cl.
　　*G01S 7/52*　　　　(2006.01)
　　*G01S 15/89*　　　(2006.01)
　　*G06F 1/03*　　　　(2006.01)
　　*G06F 3/06*　　　　(2006.01)
　　*G06F 12/00*　　　(2006.01)
　　*G06F 12/0802*　　(2016.01)
　　*G10K 11/34*　　　(2006.01)

(52) U.S. Cl.
　　CPC .............. *A61B 8/54* (2013.01); *G01S 7/5202* (2013.01); *G01S 15/8915* (2013.01); *B06B 1/02* (2013.01); *B06B 1/0215* (2013.01); *G06F 1/0321* (2013.01); *G06F 3/0668* (2013.01); *G06F 12/00* (2013.01); *G06F 12/0802* (2013.01); *G10K 11/346* (2013.01)

(58) Field of Classification Search
　　CPC ....... A61B 8/5207; A61B 8/5292; A61B 8/54; G01S 7/5202; G01S 15/8915; B06B 1/02; B06B 1/0215; G10K 11/346
　　See application file for complete search history.

(56) References Cited

U.S. PATENT DOCUMENTS

| | | |
|---|---|---|
| 10,492,765 B2 | 12/2019 | Passi |
| 2016/0242739 A1* | 8/2016 | Rothberg ............. A61B 8/4494 |
| 2017/0281138 A1 | 10/2017 | Bao et al. |
| 2018/0177494 A1 | 6/2018 | Bardelli et al. |
| 2021/0270950 A1 | 9/2021 | Passi et al. |

OTHER PUBLICATIONS

Guanziroli Federico et al: "New generation of high voltage integrated devices for ultrasound: 16 Channels pulser 5 levels with integrated transmit beamformer and 64 independent HV switches", 2017 IEEE International Ultrasonics Symposium (IUS), IEEE, Sep. 6, 2017 (Sep. 6, 2017), pp. 1-4, XP033245375, DOI: 10.1109/ULTSYM.2017.8092284 [retrieved on Oct. 31, 2017] * the whole document.

EPO Search Report and Written Opinion for counterpart EP Appl. No. 23192877.1, report dated Jan. 19, 2024, 12 pgs.

* cited by examiner

METHOD AND APPARATUS FOR MANAGING WAVEFORM DATA AND DELAYS IN A WAVEFORM GENERATOR

TECHNICAL FIELD

Embodiments herein relate to a waveform generator. In particular, the waveform generator is well-suited for use in generating selected waveform signals that are applied with selected delays to transducers in an ultrasound imaging system.

BACKGROUND

Reference is made to FIG. 1 which shows a block diagram for a transmitter of an ultrasound imaging system 10. A plurality of transducer elements 12 generate acoustic signals 14a, . . . , 14n in response to corresponding waveform signals 16a, . . . , 16n. The waveform signals 16a, . . . , 16n may all be identical to each other, or all may be different from each other, or some plural number of waveform signals may be the same and others different. The waveform signals 16a, . . . , 16n are generated by a waveform generator 18 and supplied to high voltage analog pulse driver (D) circuits 20 coupled to transducer elements 12 that perform signal level shifting operations on the received waveform signal 16. Each pair of an analog pulse driver circuit 20 and transducer 12 forms a signal channel 25 for a waveform signal. The waveform generator 18 includes a waveform memory circuit and a beamforming circuit. The waveform memory circuit stores coded waveform data defining the shapes of various waveform signals. The beamforming circuit reads the coded waveform data from the memory, decodes the data to determine waveform state information and generates the corresponding waveform signal 16. The beamforming circuit further receives a delay control signal 22 generated by a delay control circuit 24. The delay control signal 22 specifies a relative delay to be applied by the beamforming circuit in supplying each of the waveform signals 16a, . . . , 16n to the corresponding waveform signal channels 25a, . . . , 25n. The analog pulse driver circuits 20 of the waveform signal channels 25 amplify the waveform signals 16 for application to the transducer elements 12 to generate the acoustic signals 14. Responsive to the delay control signal 22, the beamforming circuit produces different delayed internal triggers for each of the waveform signal channels 25a, . . . , 25n that are used to start read operations to retrieve the coded waveform data from the memory and perform decoding with a relative signal transmission delay between the waveform signal channels. The delay control signal 22 is generated by the delay control circuit 24 in response to a direction signal 26 that specifies an angle Θ for an imaging direction for the wavefront 28 of the acoustic signals 14.

Each waveform signal 16 is a pulsed voltage signal defined by a sequence of waveform steps, wherein each step is defined (at least in part) by a signal state (or value such as a voltage level). In one case, the waveform step states may be binary (i.e., there are two states: high and low, for example). In another case, the waveform step states may be ternary (i.e., there are three states: high, intermediate and low, for example). More generally speaking, the waveform step states may be m-ary (i.e., there are m distinct states or levels). FIG. 2 illustrates an example of an N step (where N=8) ternary waveform signal 16. The three states possible at each waveform step in FIG. 2 include a positive (high) voltage state (HV+), an intermediate clamp state (CLP) and a negative (high) voltage state (HV−).

Reference is now made to FIG. 3 which shows a block diagram for the waveform generator 18. The waveform generator 18 includes a first memory 100 including a plurality of delay channel memory areas 102a-102n. Each of the delay channel memory areas 102a, . . . , 102n corresponds to one of the waveform signal channels 25a, . . . , 25n and stores a digital delay value specifying for that waveform signal channel a signal delay to be applied for the generation of a corresponding one of the waveform signals 16a, . . . , 16n. Collectively, the digital delay values stored in the delay channel memory areas 102a-102n may be referred to as a delay data set which describes a delay profile for the generation of the waveform signals 16a, . . . , 16n. The digital delay values making up the delay data set are loaded in the first memory 100 by the delay control circuit 24 using the delay control signal 22. A counter circuit 104 is actuated in response to a transmission start signal 106 to begin counting and output an incrementing (for example) counter value 108. A comparison circuit 110 compares each digital delay value stored in the delay channel memory areas 102a-102n to the incrementing counter value 108. When there is a match between the incrementing counter value 108 and one of the digital delay values of the delay data set, the comparison circuit 110 asserts (for example, pulses logic high) a start transmission signal 112a-112n for the corresponding waveform signal channel 25a, . . . , 25n.

The waveform generator 18 further includes a second memory 120 including a plurality of waveform signal data channel memory areas 122a-122n. Each of the waveform signal data channel memory areas 122a, . . . , 122n corresponds to one of the waveform signal channels 25a, . . . , 25n and stores a sequence of coded waveform values specifying the waveform step states of the waveform signal 16 to be generated for that waveform signal channel (with the timing delay specified by the digital delay value stored in the corresponding delay channel memory area 102). Collectively, the coded waveform values stored in each of the waveform signal data channel memory areas 122a-122n may be referred to as a waveform data set which will result in the generation of the pulsed voltage signal levels for the desired waveform signal 16. A decoder and signal driver circuit 124 for each of the waveform signal channels 25a, . . . , 25n generates the waveform signal 16 by decoding the coded waveform values of the waveform data set retrieved from one of the waveform signal data channel memory areas 122a, . . . , 122n to identify signal states and the pulsed voltage signal levels for the waveform signal 16 are generated in accordance with the identified signal states.

Reference is now additional made to FIG. 4 which shows an example of a waveform signal data channel memory area 122. Each data location 134 in a sequence of consecutive addressable data locations for each waveform signal data channel memory area 122 includes a data field storing data bits (referred to herein as a coded waveform value) defining the m-ary signal state of a waveform step in a given waveform data set for a waveform signal 16. The decoder and signal driver circuits 124a, . . . , 124n respond to the pulsing of the start transmission signals 112a-112n by controlling an address pointer signal 126 to sequentially point to the addressable data locations 134 in the waveform signal data channel memory areas 122a-122n, respectively, that are storing the waveform data set for the desired waveform signal. The coded waveform values stored at the addressed data locations are sequentially read from the waveform signal data channel memory area 122 and output as a code sequence signal 128. Each coded waveform value in the code sequence signal 128 is decoded by a decoding function of the decoder and signal driver circuit 124 to determine an analog signal level for the corresponding waveform step. A signal generating function of the decoder and signal driver circuit 124 then generates the waveform signal 16 to include the determined signal level for each waveform step. The generated waveform signal 16 is supplied to the high voltage analog pulse driver circuit 20 (see, FIG. 1) to be level shifted in connection with driving the associated transducer 12.

The memory data locations 134 shown in FIG. 4 illustrate N (where N=8) sequentially addressable data locations storing the coded waveform values for the waveform data set of the example waveform signal shown in FIG. 2. It will be understood that the memory area 122 may include many more than N data locations 134. Because the waveform signal is of a ternary type, only two bits are needed for the coded waveform values to code the three possible signal states for each step (where, for example, the coded waveform value <10> codes the positive (high) voltage state (HV+), the coded waveform value <11> codes the intermediate clamp state (CLP), and the coded waveform value <01> codes the negative (high) voltage state (HV−)). So, in the context of the example waveform signal 16 shown in FIG. 2, the first data location 134 in the sequence stores coded waveform value <11> for the intermediate clamp state of signal step 1, the second data location 134 in the sequence stores coded waveform value <10> for the positive (high) voltage state of signal step 2, the third data location 134 in the sequence stores coded waveform value <01> for the negative (high) voltage state of signal step 3, . . . , and the eighth data location 134 in the sequence stores coded waveform value <11> for the intermediate clamp state of signal step 8.

In the implementation shown in FIG. 3, the first memory 100, counter 104, comparison circuit 110 and decoder and signal driver circuits 124a, . . . , 124n generally correspond to the beamformer circuit of the waveform generator 18 in FIG. 1 and the second memory 120 corresponds to the waveform memory circuit of the waveform generator 18 in FIG. 1.

It will be noted that the implementation of the waveform generator 18 as shown in FIG. 3 utilizes dedicated memory resources for each waveform channel 25. In other words, each waveform channel 25 is associated with a dedicated delay channel memory 102 and a dedicated waveform signal data channel memory area 122. The memory resources with this implementation are not managed efficiently.

SUMMARY

In an embodiment, a waveform generator comprises: a plurality of signal channels; a memory including: a shared area configured to store a plurality of waveform data sets, each waveform data set comprising a sequence of coded waveform values specifying waveform step states; and an active area including a buffer for each signal channel, each buffer configured to store a selected waveform data set of the plurality of waveform data sets; and a signal decode circuit coupled to the buffer for each signal channel. The memory further comprises: a signal pointer configured to address said shared area of the memory to read one waveform data set from the memory; and a mask vector circuit configured to selectively load said one waveform data set as the selected waveform data set into one or more of the buffers in the active area of the memory in accordance with a mask signal. The signal decode circuit is configured to decode the coded waveform values of the selected waveform data set in the buffer and generate a waveform signal on the signal channel having the waveform step states.

In an embodiment, a waveform generator comprises: a plurality of signal channels; and a memory including: a shared area configured to: store a plurality of delay data sets, each delay data set comprising a digital delay value for each signal channel; and a plurality of waveform data sets, each waveform data set comprising a sequence of coded waveform values specifying waveform step states; and an active area including a buffer for each signal channel, each buffer configured to store a selected waveform data set. A signal decode circuit is coupled to the buffer for each signal channel, wherein said signal decode circuit is configured to decode the coded waveform values of the waveform data set in the buffer and generate a waveform signal on the signal channel having the waveform step states. A delay control circuit is configured to control the signal decode circuits to generate the waveform signals with a delay profile specified by the digital delay values of a selected delay data set. The memory further comprises: a delay pointer configured to address said shared area of the memory to read the selected delay data set from the memory; and a signal pointer configured to address said shared area of the memory to read the selected waveform data set from the memory.

In an embodiment, a waveform generator comprises: a plurality of signal channels; and a memory including: a delay area including a plurality of rows, wherein each row is configured to store a delay data set with a digital delay value for each signal channel; a shared area configured to store a plurality of waveform data sets, each waveform data set comprising a sequence of coded waveform values specifying waveform step states; and an active area including a buffer for each signal channel, each buffer configured to store a selected waveform data set. A signal decode circuit is coupled to the buffer for each signal channel, wherein said signal decode circuit is configured to decode the coded waveform values of the waveform data set in the buffer and generate a waveform signal on the signal channel having the waveform step states. A delay control circuit is configured to control the signal decode circuits to generate the waveform signals with a delay profile specified by the digital delay values of a selected delay data set. The memory further comprises: a delay pointer configured to address a selected row of said delay area of the memory to read the selected delay data set from the memory; and a signal pointer configured to address said shared area of the memory to read the selected waveform data set from the memory.

The waveform generator may be used in a system where each waveform signal is applied to a transducer.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 5A:
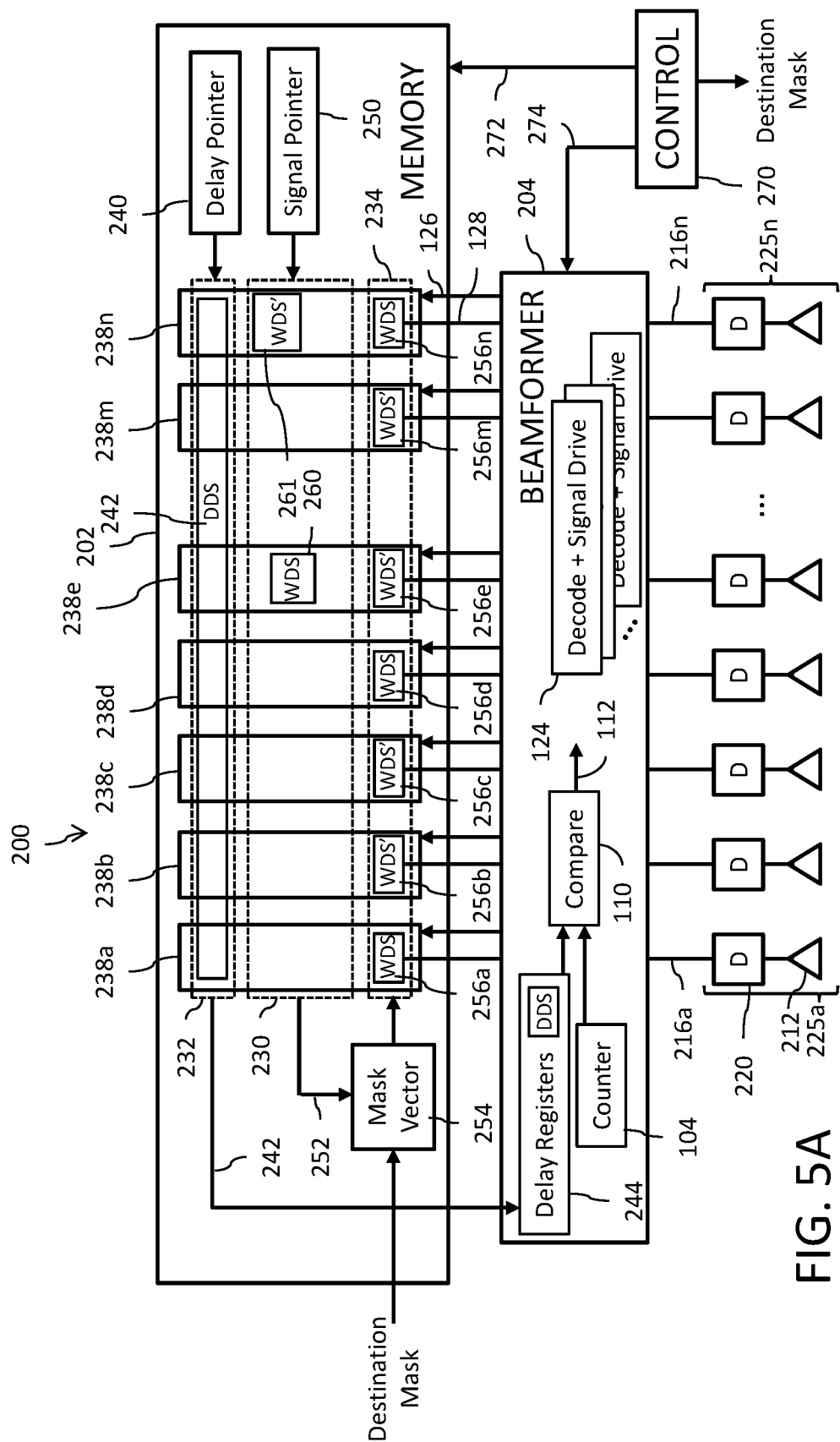
FIGS. 5A and 5B each show a block diagram for an improved transmitter of an ultrasound imaging system.

Reference is made to FIG. 5A which shows a block diagram for a transmitter of an ultrasound imaging system 200. A plurality of transducer elements 212 generate acoustic signals in response to corresponding waveform signals 216a, ..., 216n. The waveform signals 216a, ..., 216n may all be identical to each other, or all may be different from each other, or some plural number of waveform signals may be the same and others different. The waveform signals 216a, ..., 216n are generated by a waveform generator and supplied to the high voltage analog pulse driver (D) circuits 220 coupled to transducer elements 212 that perform signal level shifting operations on the received waveform signal 216. Each pair of an analog pulse driver circuit 220 and transducer 212 forms a signal channel 225 for a waveform signal 216.

The waveform generator includes a memory circuit 202 and a beamforming circuit 204. The memory circuit 202 includes a shared waveform area 230 which stores waveform data sets (WDS), wherein each waveform data set comprises a sequence of coded waveform values specifying the waveform step states, representing the shapes of various waveform signals 216. The memory circuit 202 further includes a shared delay set area 232 which stores delay data sets (DDS), wherein each delay data set includes digital delay values specifying the signal delays to be applied at the waveform signal channels 225a, ..., 225n, representing various delay profiles for the generation of the waveform signals 216a, ..., 216n. The memory circuit 202 still further includes an active area 234 which stores the waveform data sets for the waveform signal channels 225a, ..., 225n representing the shapes of the waveform signals 16a, ..., 16n that have been selected to be generated in order to produce a desired acoustic signal output.

The memory circuit 202 may be implemented as any suitable memory circuit such as a random access memory (RAM) and can be arranged in a plurality of memory column (or memory block) areas 238a, ..., 238n corresponding to the plurality of channels 225a, ..., 225n. Each memory column area 238 includes N memory rows (for example, N=256). The first X rows (i.e., rows 0 to X-1) in each column area 238 are a part of the active area 234, the next Y rows (i.e., rows X to X+Y-1) are a part of the shared waveform area 230, and the next Z rows (i.e., rows X+Y to N-1) are a part of the delay set area 232.

A delay pointer 240 is used to selectively point to a row of memory locations in the delay set area 232 to read one of the stored delay data sets (DDS) from the memory 202 which provides the digital delay values for a desired delay profile to be applied in the generation of the waveform signals 216a, ..., 216n for the corresponding waveform signal channels 225a, ..., 225n. For example, the value of the delay pointer may specify a certain row across the column areas 238a, ..., 238n in the delay set area 232 where a corresponding set of n digital delay values data set are stored. The digital delay values of the selected row are read from the memory and used to specify the delays for each channel of a given transmission.

Figure 3:
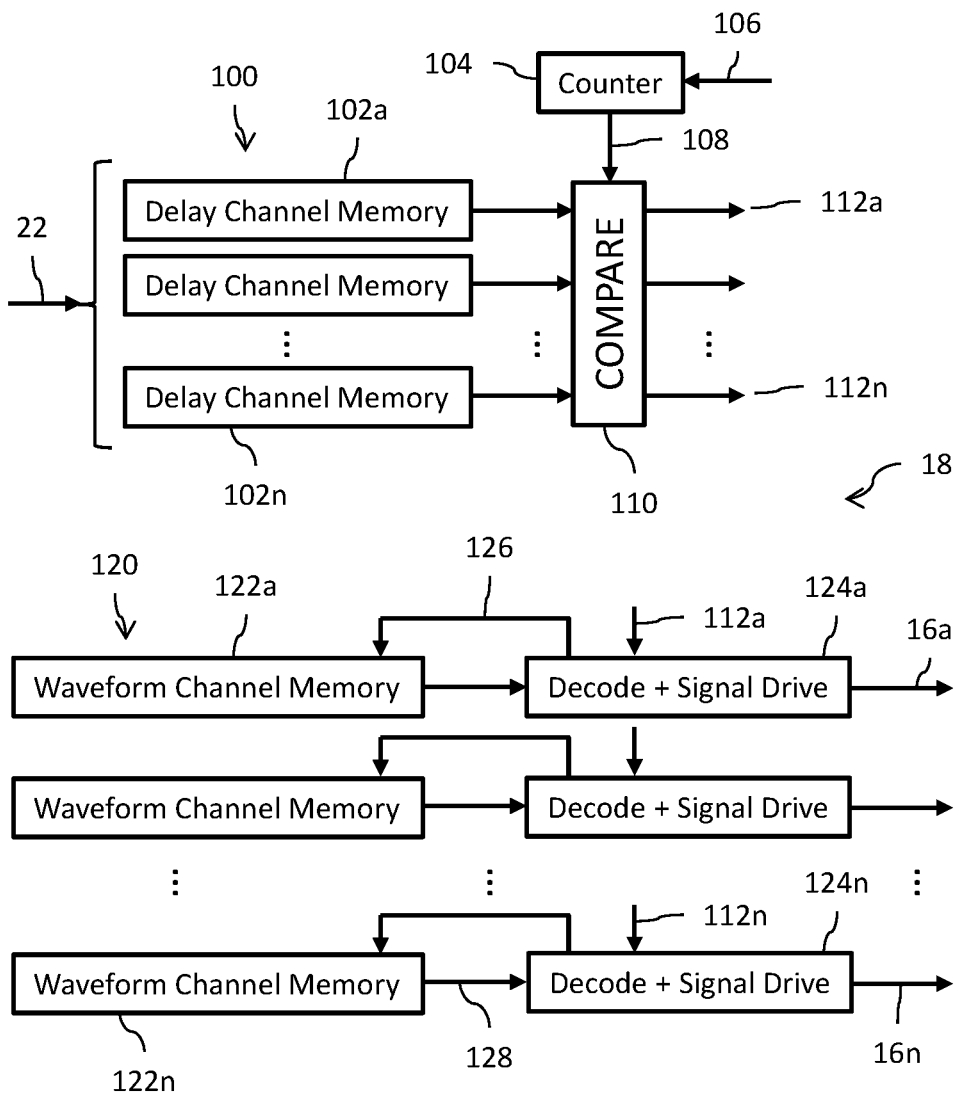
FIG. 3 is a block diagram of a waveform generator.
Figure 4:
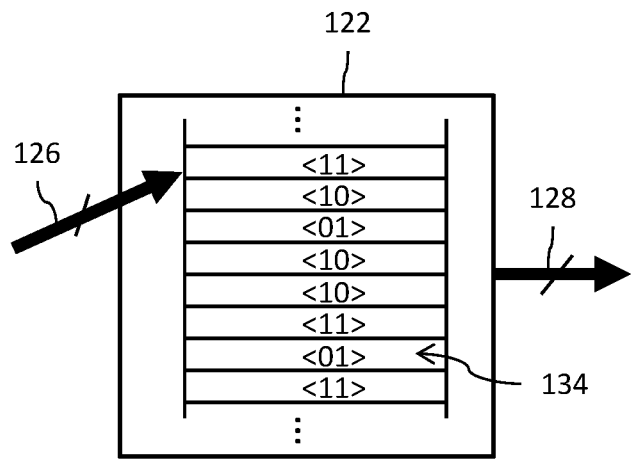
FIG. 4 shows an example of a waveform channel memory storing data for generating the waveform signal shown in FIG. 2.

Reading from the row identified by the address loaded in the delay pointer 240, the digital delay values of the read delay data set 242 are then loaded in the delay registers 244 of the beamforming circuit 204. The delay registers 244 store the digital delay values and the beamforming circuit 204 includes a comparison circuit 110 that operates to compare an incrementing counter value (generated by a counter circuit 104) to each of the register stored delay values for the purpose of triggering waveform signal 216 generation (see, FIG. 3, signals 112a-112n). FIG. 5A specifically illustrates, by example, the pointing of the delay pointer 240 to one row of memory locations 246 across the column areas 238 storing the digital delay values for a certain delay data set DDS to produce the read digital delay set 242 for storage in the delay registers 244.

It will be noted that consecutive rows of memory locations in the delay set area 232 can be loaded with consecutive sets of digital delay values. A processing automation can be implemented where the delay pointer 240 is auto-incremented by one at the end of each transmission to select the next set of digital delay values for the next transmission.

A signal pointer 250 of the memory circuit 202 is used to selectively point to a sequence of memory locations in the shared waveform area 230 to read one of the stored waveform data sets (WDS) from the memory which provides the sequence of coded waveform values specifying shape of a desired one of the waveform signals 216 to be generated. For example, the value of the signal pointer may specify a starting location at a certain row in a certain one of column areas 238a, ..., 238n for a sequence of memory locations the shared waveform area 230 where the sequence of coded waveform values for a selected waveform data set is stored.

Reading from the starting location identified by the address loaded in the signal pointer 250, the sequence of coded waveform values for the selected waveform data set 252 are then processed through a mask vector circuit 254 and selectively loaded into one of more of the buffer memory areas 256a, ..., 256n (within column areas 238a, ..., 238n, respectively) of the active area 234. The mask vector circuit 254 receives a destination mask signal that specifically identifies which one or ones of the buffer memory areas 256 are to be loaded with the read waveform data set 252. The destination mask signal may, for example, comprise an n-bit digital signal wherein a logic high value at a given bit location in the signal specifies that the read waveform data set 252 is to be stored in the buffer memory area 256 corresponding to that bit location. It is important to note that the waveform data set for the desired waveform signal shape can be stored in any of the column areas 238a, ..., 238n of the shared waveform area 230. In other words, due to the shared nature of the shared waveform area 230, the waveform data set stored in a given one of the column areas 238 is not linked to the corresponding signal channel, and may indeed be used by the beamforming circuit in connection with generating the waveform signal for any signal channel (subject to selection made by the vector mask circuit). As an example, the sequence of memory locations in the shared waveform area 230 may comprise p memory locations, wherein the sequence of p memory locations stores the coded waveform values for the waveform data set defining one or more waveform steps of the desired waveform signal 216. A decoder and signal driver circuit 124 for each waveform signal channel 225 applies an address pointer signal 126 to sequentially point to addressable data locations in the buffer memory area 256 that store the waveform data set for the desired waveform signal. The coded waveform values stored at the addressed data locations are sequentially read from the buffer memory area 256 and output as a code sequence signal 128. Each coded waveform value in the code sequence signal 128 is decoded by a decoding function of the decoder and signal driver circuit 124 to determine an analog signal level for the corresponding waveform step. A signal generating function of the decoder and signal driver circuit 124 then generates the waveform signal 216 to include the determined analog signal level for each waveform step. The generated waveform signal 216 is supplied to the high voltage analog pulse driver circuit 220 to be level shifted in connection with driving the associated transducer 212.

FIG. 5A specifically illustrates, by example, the pointing of the signal pointer 250 to a sequence of memory locations 260 in column area 238e storing coded waveform values for the waveform data set WDS of a desired waveform signal. In this example, the n-bit destination mask signal has a value of <10010 . . . 01>. The logic "1" data bits in the destination mask signal indicate that read waveform data set 252 is to be selectively stored by the mask vector circuit 254 in the buffer memory areas 256a, 256d and 256n (of corresponding column areas 238a, 238d, and 238n). The logic "0" data bits in the n-bit destination mask signal indicate that the read waveform data set 252 is blocked by the mask vector circuit 254 from being loaded in the buffer memory areas of the corresponding column areas. The coded waveform values of this waveform data set WDS are then processed by the decoder and signal driver circuits 124 to generate the waveform signals 216a, 216d and 216n for channels 225a, 225d, and 225n. FIG. 5A further illustrates, by example, the pointing of the signal pointer 250 to a sequence of memory locations 261 in column area 238n storing coded waveform values for another waveform data set WDS' of a desired waveform signal. In this example, the n-bit destination mask signal has a value of <01101 . . . 10>. The logic "1" data bits in the destination mask signal indicate that read waveform data set 252 is to be selectively stored by the mask vector circuit 254 in the buffer memory areas 256b, 256c, 256e and 256m (of corresponding column areas 238b, 238c, 238e and 238m). The logic "0" data bits in the n-bit destination mask signal indicate that the read waveform data set 252 is blocked by the mask vector circuit 254 from being loaded in the buffer memory areas of the corresponding column areas. The coded waveform values of this another waveform data set WDS' are then processed by the decoder and signal driver circuits 124 to generate the waveform signals 216b, 216c 216e and 216m for channels 225b, 225c, 225e and 225m.

From the foregoing, it will be noted that the process for reading a waveform data set from the shared waveform area 230 using the signal pointer 250 can be repeated as many times as necessary to selectively load through the mask vector circuit 254 a sequence of coded waveform values in each of the buffer memory areas 256a, . . . , 256n.

A control circuit 270 generates a load command signal 272 that is applied to the memory 202. Responsive to this load command signal 272, the memory 202 is configured to use the delay pointer 240 to retrieve the desired one delay profiles stored in the delay set area 232 for loading in the delay registers 244 of the beamforming circuit 204. Further responsive to this load command signal 272, the memory 202 is configured to use the signal pointer 250 to retrieve the coded waveform data for the waveform data sets WDS of one or more desired waveform signals for loading in the buffer memory areas 256a, . . . , 256n. The control circuit 270 further generates a counter start command signal 274 that is applied to the counter circuit 104 in the beamformer circuit 204. Responsive to this counter start command signal 274, incrementing of the counter 104 is initiated. When the comparison circuit 110 determines that the incrementing count value matches any of the digital delay values stored in the delay registers 244, the start transmission signal 112 is pulsed and the corresponding decoder and signal driver circuit 124 retrieves the coded waveform data for the waveform data set WDS from buffer memory area 256 to generate the waveform signal 216. The control circuit 270 still further generates the destination mask signal to control the mask vector 254 operation for selectively loading coded waveform data in the buffer memory areas 256a, . . . , 256n.

It will be noted that in the embodiment of FIG. 5A, the memory resources of memory circuit 202 are separated into three general types: a) a shared waveform area 230 where waveform data sets are stored; b) a delay set area 232 where delay data sets are stored; and c) an active memory area 234 that provides an output buffer 256 dedicated to each channel 225 in order to support independent waveform signal generation with a configured timing delay. There are fixed boundaries between the three types, and the user can configure the memory circuit 202, and in particular the size of each of the shared memory area 230, the delay set area 232, and the active memory area 234 as necessary in order to store the desired number of waveform data sets and delay data sets. Separation between the shared memory area 230, delay set area 232, and the active memory area 234 is logical (or functional) only, not necessarily physical. So, it will be understood that the boundaries between the areas 230, 232, 234 are flexible. The actual addresses occupied by each type of data are simply defined by the user. The only limitation that is imposed is given by the actual physical memory size.

Operation of the memory for loading the desired waveform data set(s) and desired delay data set is efficient. Turning first to the loading of the desired delay data set, the delay pointer 240 is used to point to a row location in the delay set area 232 across the column areas 238 that stores the digital delay data (of the desired delay profile defined by the delay data set) for each of the signal channel 225. The read digital delay data values at that row are loaded in the delay registers 244 and are ready to be used to manage individual signal delays in connection with generating the waveform signals 216a, . . . , 216n. Turning next to the loading of the desired waveform data set(s), the signal pointer 250 is used to point to a starting location anywhere in the shared memory area (more specifically within the shared waveform area 230) to select a memory row within a column area 238 that stores the coded waveform data for a first waveform step (of the desired waveform signal defined by the waveform data set). From this memory location, the sequentially following locations store the coded waveform data for the remaining waveform steps in the waveform data set. The last memory location in the sequence stores an end (or stop) code indicating that the end of the waveform data set has been reached. The coded waveform data for the read waveform data set is then selectively loaded in the buffer memory areas 256a, . . . , 256n dependent on asserted bits of the destination mask signal. The process is repeated as necessary to load a waveform data set in each buffer 256.

Figure 5B:
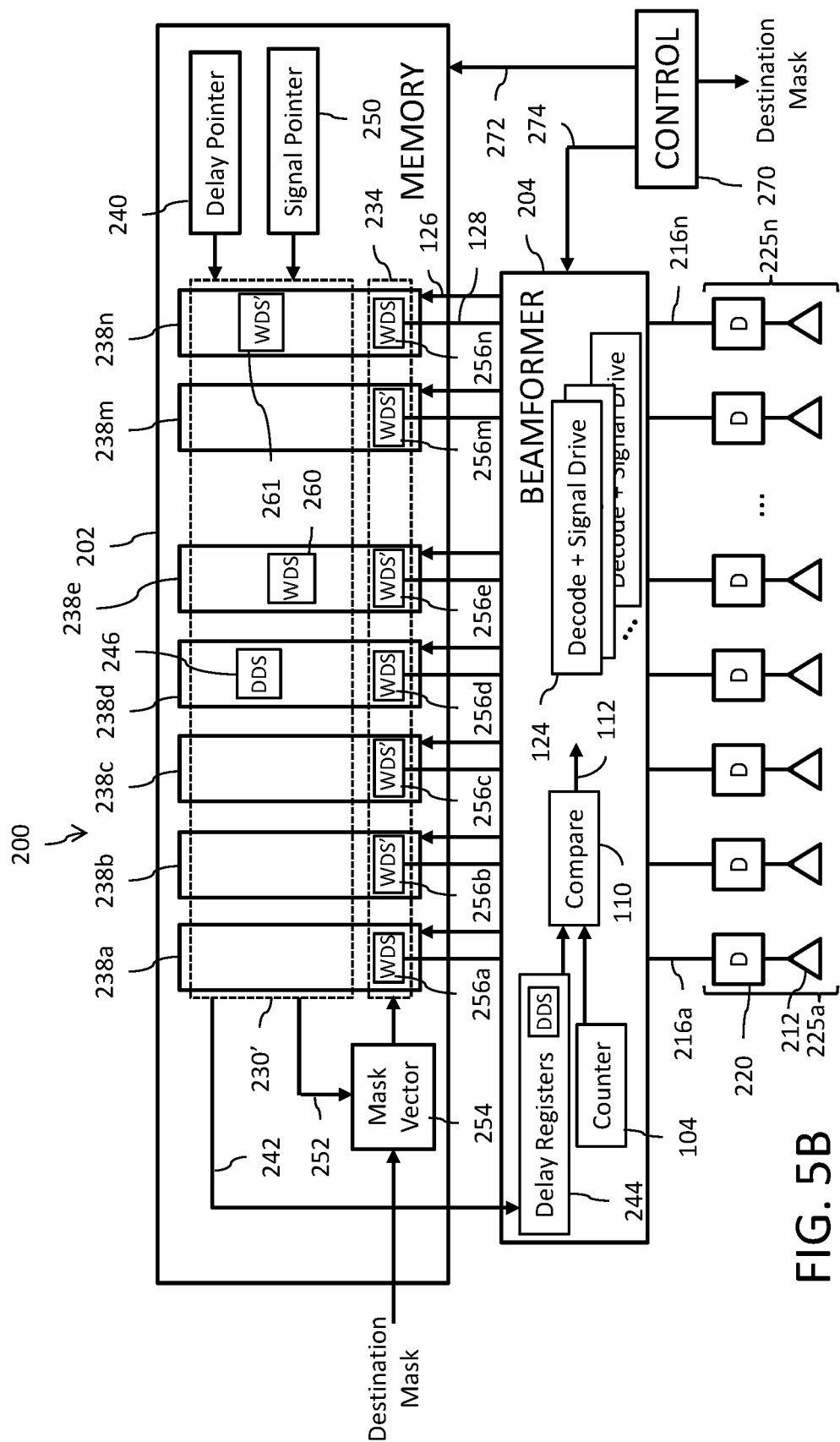

Reference is made to FIG. 5B which shows a block diagram for another embodiment of a transmitter of an ultrasound imaging system 200. A plurality of transducer elements 212 generate acoustic signals in response to corresponding waveform signals 216a, . . . , 216n. The waveform signals 216a, . . . , 216n may all be identical to each other, or all may be different from each other, or some plural number of waveform signals may be the same and others different. The waveform signals 216a, . . . , 216n are generated by a waveform generator and supplied to the high voltage analog pulse driver (D) circuits 220 coupled to transducer elements 212 that perform signal level shifting operations on the received waveform signal 216. Each pair of an analog pulse driver circuit 220 and transducer 212 forms a signal channel 225 for a waveform signal 216.

The waveform generator includes a memory circuit 202 and a beamforming circuit 204. The memory circuit 202 includes a shared delay set and waveform area 230' that stores waveform data sets (WDS), wherein each waveform data set comprises a sequence of coded waveform values specifying the waveform step states, representing the shapes of various waveform signals 216. The shared delay set and waveform area 230' of the memory circuit 202 further stores delay data sets (DDS), wherein each delay data set includes digital delay values specifying the signal delays to be applied at the waveform signal channels 225a, . . . , 225n, representing various delay profiles for the generation of the waveform signals 216a, . . . , 216n. The memory circuit 202 still further includes an active area 234 which stores the waveform data sets for the waveform signal channels 225a, . . . , 225n representing the shapes of the waveform signals 16a, . . . , 16n that have been selected to be generated in order to produce a desired acoustic signal output.

The memory circuit 202 may be implemented as any suitable memory circuit such as a random access memory (RAM) and can be arranged in a plurality of memory column (or memory block) areas 238a, . . . , 238n corresponding to the plurality of channels 225a, . . . , 225n. Each memory column area 238 includes N memory rows (for example, N=256). The first X rows (i.e., rows 0 to X-1) in each column area 238 are a part of the active area 234, the next Y rows (i.e., rows X to N-1) are a part of the shared delay set and waveform area 230'.

A delay pointer 240 of the memory circuit 202 is used to selectively point to a sequence of memory locations in the shared delay set and waveform area 230' to read one of the stored delay data sets (DDS) from the memory 202 which provides the digital delay values for a desired delay profile to be applied in the generation of the waveform signals 216a, . . . , 216n for the corresponding waveform signal channels 225a, . . . , 225n. For example, the value of the delay pointer may specify a starting location at a certain row in a certain one of column areas 238a, . . . , 238n for a sequence of memory locations in the shared delay set and waveform area 230' where the digital delay values of a selected delay data set are stored.

Reading from the starting location identified by the address loaded in the delay pointer 240, the digital delay values of the read delay data set 242 are then loaded in the delay registers 244 of the beamforming circuit 204. It is important to note that the delay data set for the desired one of delay profiles can be stored in any of the column areas 238a, . . . , 238n of the shared delay set and waveform area 230'. In other words, due to the shared nature of the shared delay set and waveform area 230', the delay data set stored in a given one of the column areas 238 is not linked to the corresponding signal channel 225. As an example, the sequence of memory locations in the shared delay set and waveform area 230' for a given delay data set may comprise n memory locations, wherein each of the n memory locations stores a digital delay value specifying a timing delay for starting generation of the corresponding one of the n waveform signals 216. The delay registers 244 store the digital delay values and the beamforming circuit 204 includes a comparison circuit 110 that operates to compare an incrementing counter value (generated by a counter circuit 104) to each of the register stored delay values for the purpose of triggering waveform signal 216 generation (see, FIG. 3, signals 112a-112n). FIG. 5B specifically illustrates, by example, the pointing of the delay pointer 240 to a sequence of memory locations 246 in column area 238d storing the digital delay values for a certain delay data set DDS to produce the read digital delay set 242 for storage in the delay registers 244.

A signal pointer 250 of the memory circuit 202 is used to selectively point to a sequence of memory locations in the shared delay set and waveform area 230' to read one of the stored waveform data sets (WDS) from the memory which provides the sequence of coded waveform values specifying shape of a desired one of the waveform signals 216 to be generated. For example, the value of the signal pointer may specify a starting location at a certain row in a certain one of column areas 238a, . . . , 238n for a sequence of memory locations the shared delay set and waveform area 230' where the sequence of coded waveform values for a selected waveform data set is stored.

Reading from the starting location identified by the address loaded in the signal pointer 250, the sequence of coded waveform values for the selected waveform data set 252 are then processed through a mask vector circuit 254 and selectively loaded into one of more of the buffer memory areas 256a, . . . , 256n (within column areas 238a, . . . , 238n, respectively) of the active area 234. The mask vector circuit 254 receives a destination mask signal that specifically identifies which one or ones of the buffer memory areas 256 are to be loaded with the read waveform data set 252. The destination mask signal may, for example, comprise an n-bit digital signal wherein a logic high value at a given bit location in the signal specifies that the read waveform data set 252 is to be stored in the buffer memory area 256 corresponding to that bit location. It is important to note that the waveform data set for the desired waveform signal shape can be stored in any of the column areas 238a, . . . , 238n of the shared delay set and waveform area 230'. In other words, due to the shared nature of the shared delay set and waveform area 230', the waveform data set stored in a given one of the column areas 238 is not linked to the corresponding signal channel, and may indeed be used by the beamforming circuit in connection with generating the waveform signal for any signal channel (subject to selection made by the vector mask circuit). As an example, the sequence of memory locations in the shared delay set and waveform area 230' may comprise p memory locations, wherein the sequence of p memory locations stores the coded waveform values for the waveform data set defining one or more waveform steps of the desired waveform signal 216. A decoder and signal driver circuit 124 for each waveform signal channel 225 applies an address pointer signal 126 to sequentially point to addressable data locations in the buffer memory area 256 that store the waveform data set for the desired waveform signal. The coded waveform values stored at the addressed data locations are sequentially read from the buffer memory area 256 and output as a code sequence signal 128. Each coded waveform value in the code sequence signal 128 is decoded by a decoding function of the decoder and signal driver circuit 124 to determine an analog signal level for the corresponding waveform step. A signal generating function of the decoder and signal driver circuit 124 then generates the waveform signal 216 to include the determined analog signal level for each waveform step. The generated waveform signal 216 is supplied to the high voltage analog pulse driver circuit 220 to be level shifted in connection with driving the associated transducer 212.

FIG. 5B specifically illustrates, by example, the pointing of the signal pointer 250 to a sequence of memory locations 260 in column area 238e storing coded waveform values for the waveform data set WDS of a desired waveform signal. In this example, the destination mask signal has a value of <10010 . . . 01>. In this example, the n-bit destination mask signal has a value of <10010 . . . 01>. The logic "1" data bits in the destination mask signal indicate that read waveform data set 252 is to be selectively stored by the mask vector circuit 254 in the buffer memory areas 256a, 256d and 256n (of corresponding column areas 238a, 238d, and 238n). The logic "0" data bits in the n-bit destination mask signal indicate that the read waveform data set 252 is blocked by the mask vector circuit 254 from being loaded in the buffer memory areas of the corresponding column areas. The coded waveform values of this waveform data set WDS are then processed by the decoder and signal driver circuits 124 to generate the waveform signals 216a, 216d and 216n for channels 225a, 225d, and 225n. FIG. 5A further illustrates, by example, the pointing of the signal pointer 250 to a sequence of memory locations 261 in column area 238n storing coded waveform values for another waveform data set WDS' of a desired waveform signal. In this example, the n-bit destination mask signal has a value of <01101 . . . 10>. The logic "1" data bits in the destination mask signal indicate that read waveform data set 252 is to be selectively stored by the mask vector circuit 254 in the buffer memory areas 256b, 256c, 256e and 256m (of corresponding column areas 238b, 238c, 238e and 238m). The logic "0" data bits in the n-bit destination mask signal indicate that the read waveform data set 252 is blocked by the mask vector circuit 254 from being loaded in the buffer memory areas of the corresponding column areas. The coded waveform values of this another waveform data set WDS' are then processed by the decoder and signal driver circuits 124 to generate the waveform signals 216b, 216c 216e and 216m for channels 225b, 225c, 225e and 225m.

From the foregoing, it will be noted that the process for reading a waveform data set from the shared delay set and waveform area 230' using the signal pointer 250 can be repeated as many times as necessary to selectively load through the mask vector circuit 254 a sequence of coded waveform values in each of the buffer memory areas 256a, . . . , 256n.

A control circuit 270 generates a load command signal 272 that is applied to the memory 202. Responsive to this load command signal 272, the memory 202 is configured to use the delay pointer 240 to retrieve the desired one delay profiles stored in the shared delay set and waveform area 230' for loading in the delay registers 244 of the beamforming circuit 204. Further responsive to this load command signal 272, the memory 202 is configured to use the signal pointer 250 to retrieve the coded waveform data for the waveform data sets WDS of one or more desired waveform signals for loading in the buffer memory areas 256a, . . . , 256n. The control circuit 270 further generates a counter start command signal 274 that is applied to the counter circuit 104 in the beamformer circuit 204. Responsive to this counter start command signal 274, incrementing of the counter 104 is initiated. When the comparison circuit 110 determines that the incrementing count value matches any of the digital delay values stored in the delay registers 244, the start transmission signal 112 is pulsed and the corresponding decoder and signal driver circuit 124 retrieves the coded waveform data for the waveform data set WDS from buffer memory area 256 to generate the waveform signal 216. The control circuit 270 still further generates the destination mask signal to control the mask vector 254 operation for selectively loading coded waveform data in the buffer memory areas 256a, . . . , 256n.

It will be noted that in the embodiment of FIG. 5B, the memory resources of memory circuit 202 are separated into two general types: a) a shared memory and delay set area 230' where waveform data sets and delay data sets are stored; and b) an active memory area 234 that provides an output buffer 256 dedicated to each channel 225 in order to support independent waveform signal generation with a configured timing delay. There is no need to specify a fixed boundary between the two types. Rather, the user can configure the memory circuit 202, and in particular the size of each of the shared memory and delay set area 230' and the active memory area 234 as necessary in order to store the desired number of waveform data sets and delay data sets. Separation between the shared memory and delay set area 230' and the active memory area 234 is logical (or functional) only, not necessarily physical. So, it will be understood that the boundaries between the areas 230', 234 are flexible. The actual addresses occupied by each type of data are simply defined by the user. The only limitation that is imposed is given by the actual physical memory size.

Operation of the memory for loading the desired waveform data set(s) and desired delay data set is efficient. Turning first to the loading of the desired delay data set, the delay pointer 240 is used to point to a starting location anywhere in the shared memory and delay set area 230' to select a memory row within a column area 238 that stores the digital delay data (of the desired delay profile defined by the delay data set) for the first signal channel 225. From this memory location, the next n−1 sequential locations store the digital delay data for the remaining signal channels 225. The read digital delay data values are loaded in the delay registers 244 and are ready to be used to manage individual signal delays in connection with generating the waveform signals 216a, . . . , 216n. Turning next to the loading of the desired waveform data set(s), the signal pointer 250 is used to point to a starting location anywhere in the shared memory and delay set area 230' to select a memory row within a column area 238 that stores the coded waveform data for a first waveform step (of the desired waveform signal defined by the waveform data set). From this memory location, the sequentially following locations store the coded waveform data for the remaining waveform steps in the waveform data set. The last memory location in the sequence stores an end (or stop) code indicating that the end of the waveform data set has been reached. The coded waveform data for the read waveform data set is then selectively loaded in the buffer memory areas 256a, . . . , 256n dependent on asserted bits of the destination mask signal. The process is repeated as necessary to load a waveform data set in each buffer 256.

Figure 6A:
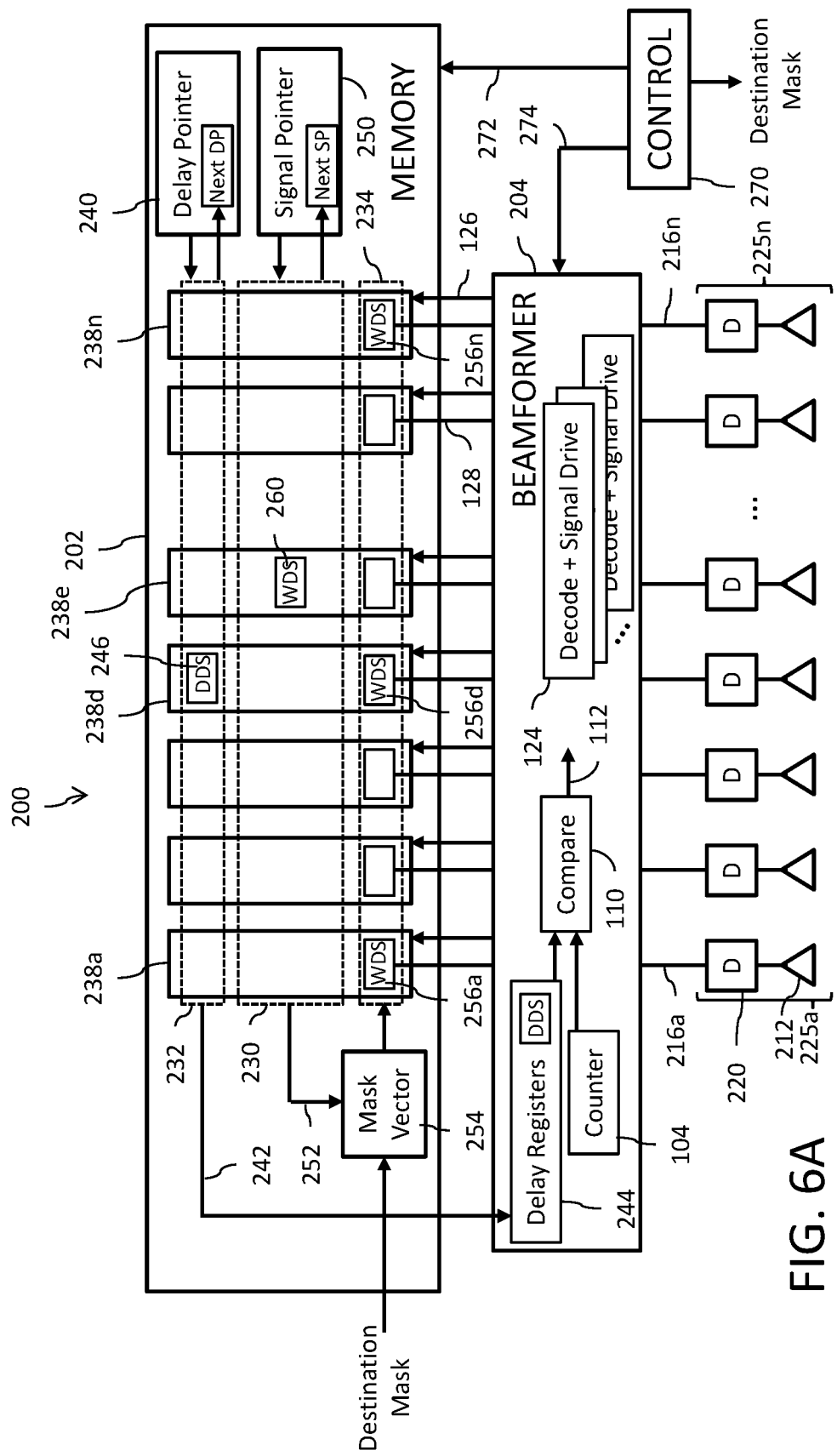
FIGS. 6A and 6B each show a block diagram for an improved transmitter of an ultrasound imaging system.

Reference is now made to FIG. 6A. Like references in FIGS. 5A and 6A refer to same components and functionality whose description will not be repeated. The implementation of FIG. 6A differs from the implementation of FIG. 5A in the support of an auto-loading functionality for either or both the delay pointer 240 and the signal pointer 250.

Turning first to auto-loading for the delay pointer 240, a delay data set (DDS) stored in the memory 202 provides the digital delay values for a desired delay profile to be applied in the generation of the waveform signals 216a, . . . , 216n for the corresponding waveform signal channels 225a, ..., 225n along with an end value specifying a next delay pointer address for accessing the next delay data set. This is shown by the following:

```
Delay a
Delay b
Delay c
Delay d
Delay e
  . . .
Delay n
End; Addr
```

Here, the entries for Delay a through Delay n in the delay data set specify the digital delay values for a delay profile to be applied to the corresponding waveform signals 216a, ..., 216n of a given acoustic signal transmission. The last entry in the delay data set includes an end tag (End) along with an address value (Addr). This address value Addr specifies a starting location at a certain row in a certain one of column areas 238a, ..., 238n for a sequence of memory locations in the shared delay set area 232 where the digital delay values of a next delay data set are stored.

The delay pointer 240 is loaded with the address pointing to the starting location of the selected delay data set. Reading from the starting location, the digital delay values Delay a, ..., Delay n of the read delay data set 242 are then loaded in delay registers 244a, ..., 244n, respectively, of the beamforming circuit 204. Then the last entry in the delay data set including the end tag (End) is read. In response to reading the end tag, the address value (Addr) is extracted and loaded into a next delay pointer (Next DP) register. Following transmission of the acoustic signal using the waveform signals 216a, ..., 216n delayed in accordance with the delay profile specified by the selected delay data set, the address value (Addr) in the Next DP register is then automatically loaded into the delay pointer 240, with this address value pointing to the starting location of the next selected delay data set. Reading from that starting location, the digital delay values of another read delay data set 242 are then loaded in delay registers 244a, ..., 244n. Transmission of the acoustic signal using the waveform signals 216a, ..., 216n delayed in accordance with the delay profile specified by the next selected delay data set is then made. It will be noted that this automatic delay profile loading functionality provides an added level of efficiency to signal generation in that there is no need for the user to specifically enter a new delay pointer value just before each signal transmission. Instead, by selecting a delay data set that includes the end tag with a preloaded address value (Addr), there will be an automatic loading of the next delay data set dependent on the previous delay data set.

Turning next to auto-loading for the signal pointer 250, a waveform data set (WDS) stored in the memory 202 provides the sequence of coded waveform values specifying the shape of a desired one of the waveform signals 216 to be generated along with an end value specifying a next signal pointer address for accessing the next waveform data set. This is shown by the following:

```
Code CLP
Code HV+
Code HV−
Code HV+
Code HV+
Code CLP
```

-continued

```
Code HV−
Code CLP
End; Addr
```

Figure 1:
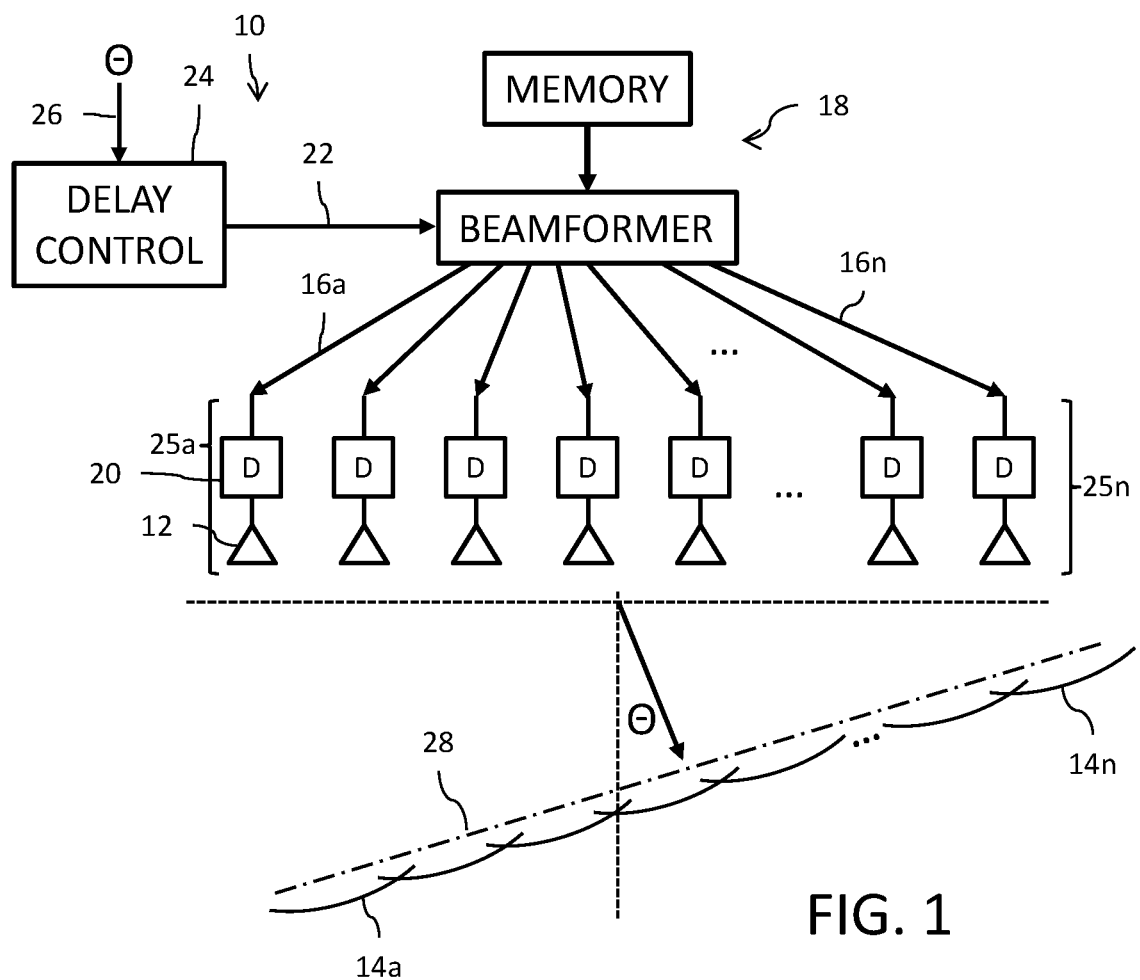
FIG. 1 is a block diagram for a transmitter of an ultrasound imaging system.
Figure 2:
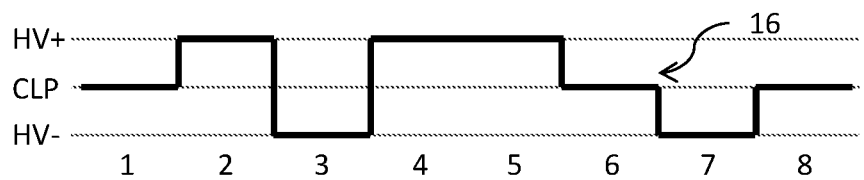
FIG. 2 illustrates an example of a multi-step ternary waveform signal.

Here, the code entries (HV+, HV−, CLP) specify signal states (levels) for a sequence of waveform steps of the waveform signal shown in FIG. 2. The last entry in the waveform data set includes an end tag (End) along with an address value (Addr). This address value Addr specifies a starting location at a certain row in a certain one of column areas 238a, ..., 238n for a sequence of memory locations in the shared waveform area 230 where the sequence of coded waveform values of a next waveform data set are stored.

The signal pointer 250 is loaded with the address pointing to the starting location of the selected waveform data set. Reading from the starting location, the coded waveform values Code CLP, Code HV+, ..., Code CLP of the read waveform data set 252 are then selectively loaded in the buffer memory areas 256a, ..., 256n. It will be noted that this loading operation can be, as described above, made subject to the logic state of the bits of the mask vector signal. Then the last entry in the waveform data set including the end tag (End) is read. In response to reading the end tag, the address value (Addr) is extracted and loaded into a next signal pointer (Next SP) register. Following transmission of the acoustic signal using waveform signals 216a, ..., 216n whose shapes are specified by the waveform data set(s), the address value (Addr) is then automatically loaded into the signal pointer 250, with this address value pointing to the starting location of the next selected waveform data set. Reading from that starting location, the coded waveform values of another waveform data set 252 are then selectively loaded in the buffer memory areas 256a, ..., 256n. Again, this load can be made subject to the to the logic state of the bits of the mask vector signal. Transmission of the acoustic signal using the waveform signals 216a, ..., 216n having shapes are specified by the next waveform data set(s) is then made. It will be noted that this automatic waveform data set loading functionality provides an added level of efficiency to signal generation in that there is no need for the user to specifically enter a new signal pointer value just before each signal transmission. Instead, by selecting a waveform data set that includes the end tag with a preloaded address value (Addr), there will be an automatic loading of the next waveform data set dependent on the previous waveform data set.

Figure 6B:
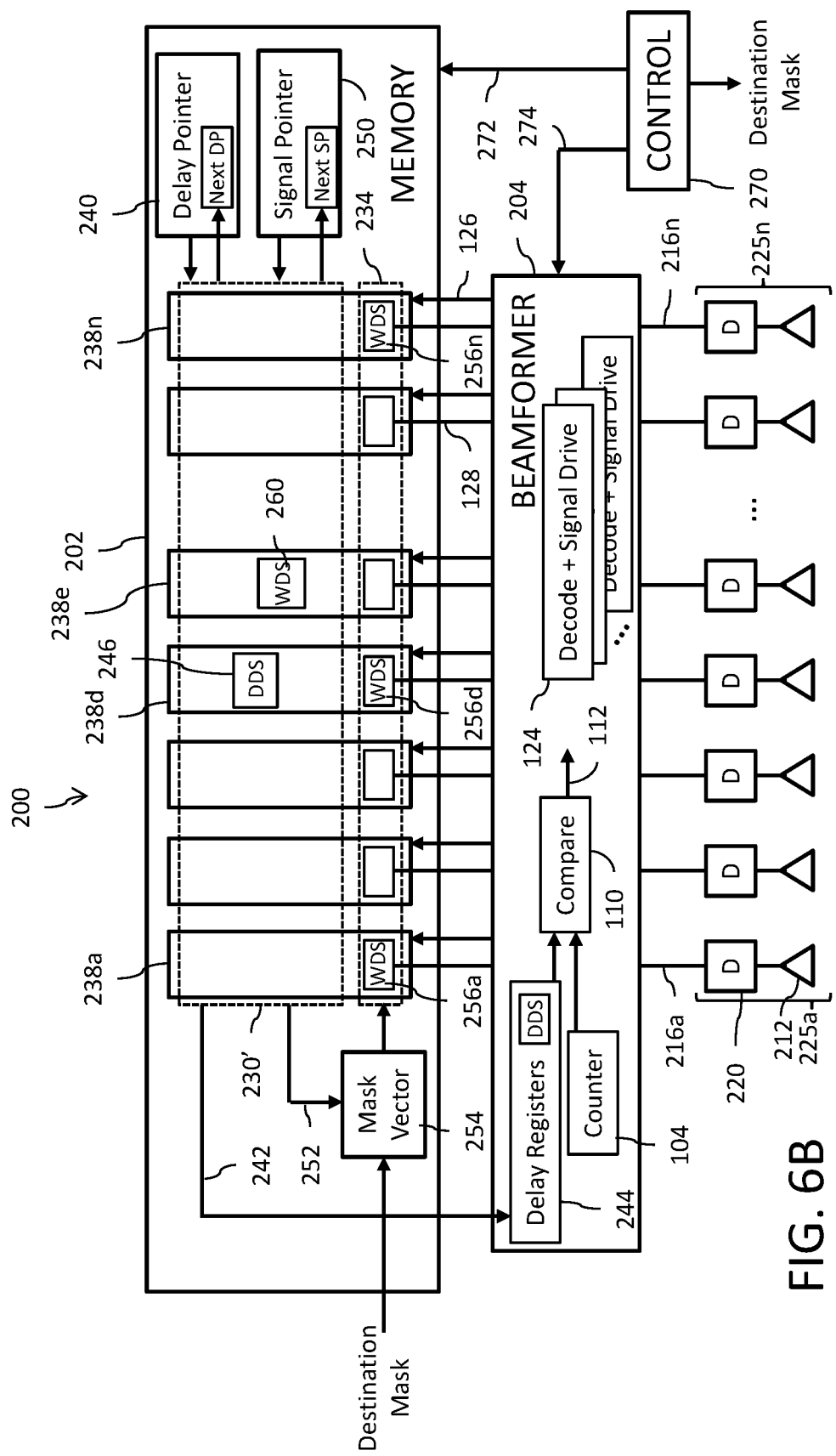

Reference is now made to FIG. 6B. Like references in FIGS. 5B and 6B refer to same components and functionality whose description will not be repeated. The implementation of FIG. 6B differs from the implementation of FIG. 5B in the support of an auto-loading functionality for either or both the delay pointer 240 and the signal pointer 250. This functionality operates in a manner like that described above in connection with FIGS. 5A and 6A except that memory access is made to the memory area 230' as opposed to the memory areas 230 and 232.

FIGS. 7A-7F illustrate a flow of processing steps for an example implementation of the auto-loading functionality for the delay pointer 240. In this example, a simplification is shown using only three channels 225, and three delay registers 244a, 244b, and 244c. It will, however, be understood that no correlation between the number n of delayed data sets DDSn and the number of channels 25 is imposed. The shared delay set area 232 stores three delay data sets DDS1, DDS2, and DDS3. Each delay data set includes three digital delay values specifying the signal delays to be applied at the waveform signal channels 225 representing various delay profiles for the generation of the waveform signals 216. Each delay data set DDS further includes a last entry with an end tag (End). The end tag End of the delay data set DDS1 further includes an address Addr for the delay data set DDS3, and the end tag End of the delay data set DDS2 further includes an address Addr for the delay data set DDS1.

Figure 7A:
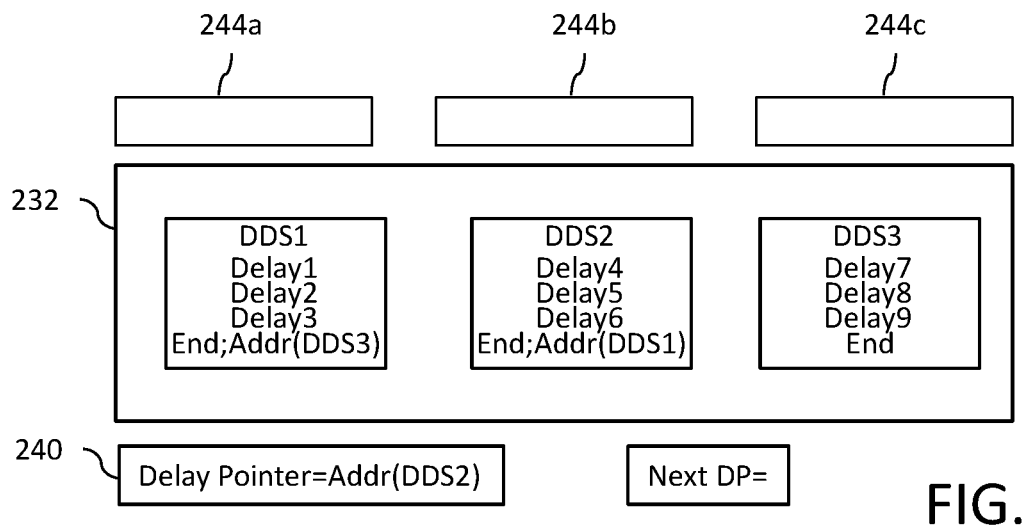
FIGS. 7A-7F illustrate a flow of processing steps for an example implementation of the auto-loading functionality for the delay pointer.
Figure 7B:
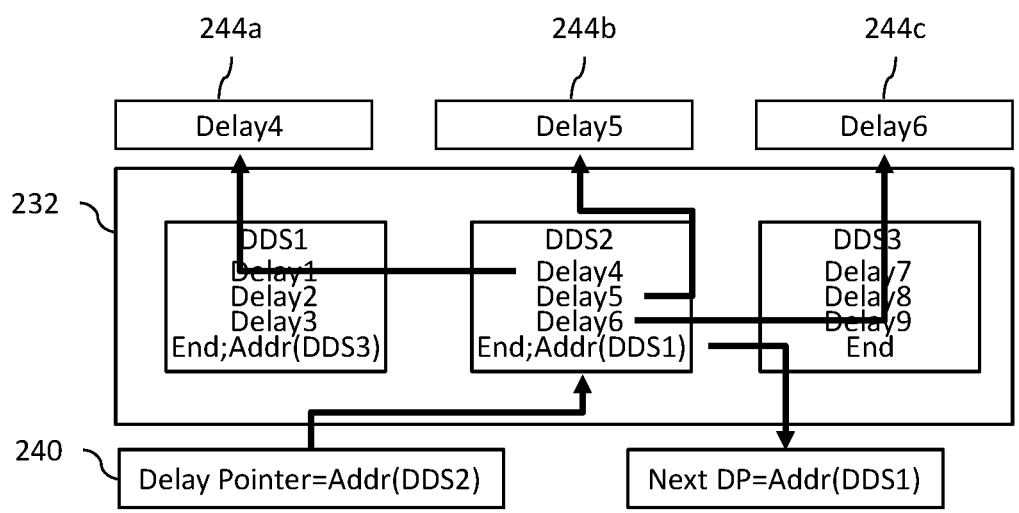
Figure 7C:
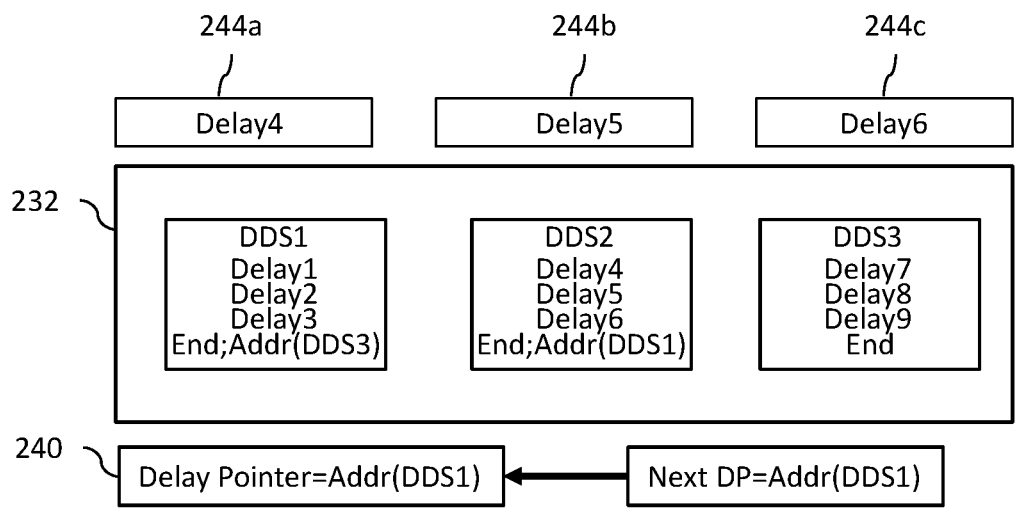
Figure 7D:
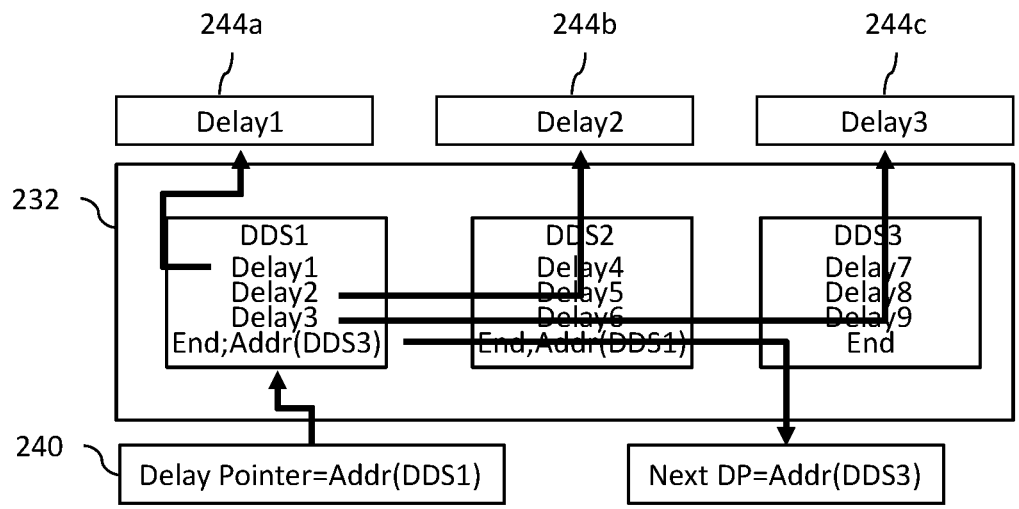
Figure 7E:
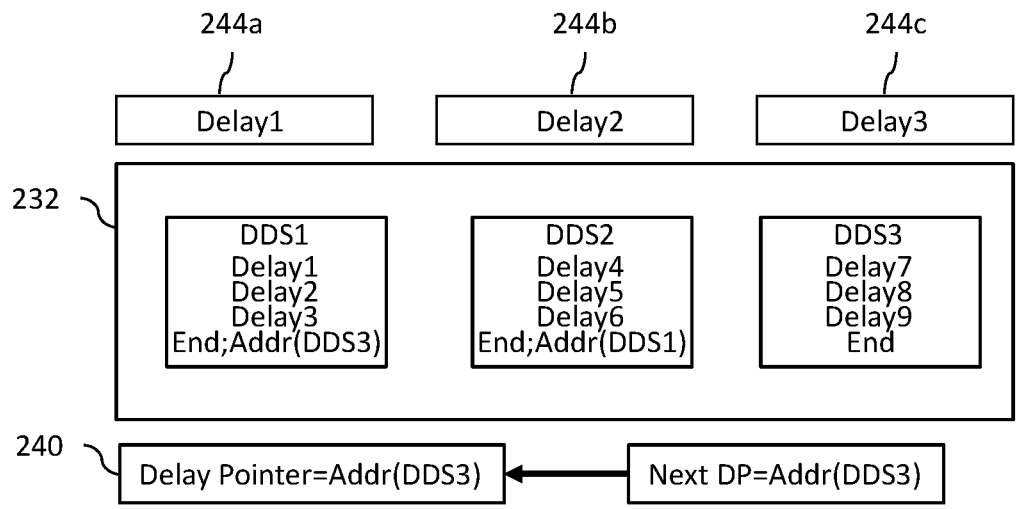
Figure 7F:
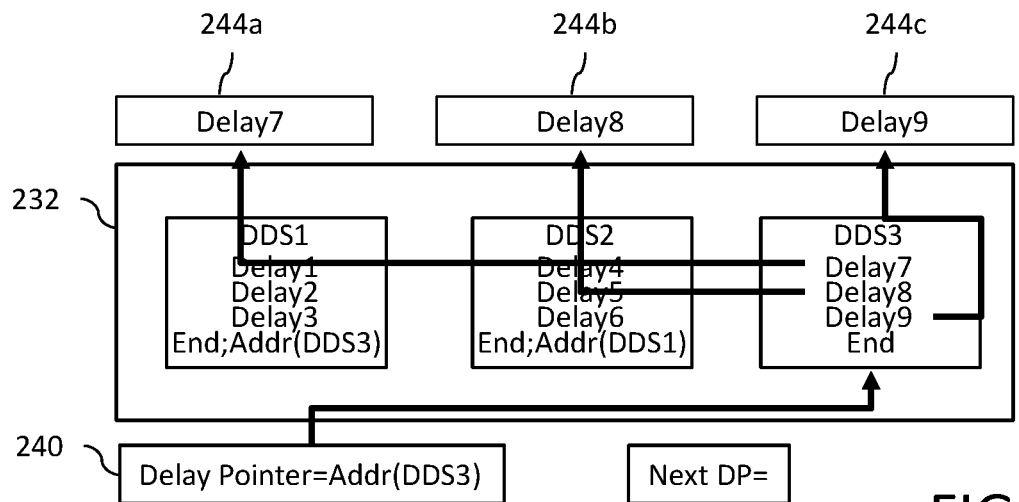

As a starting condition, FIG. 7A shows that the delay pointer 240 is loaded with the address in the shared delay set area 232 of the delay data set DDS2. Responsive thereto, FIG. 7B shows that the delay values Delay4, Delay5, and Delay6 of the delay data set DDS2 are read from the shared delay set area 232 and loaded into the delay registers 244a, 244b, and 244c, respectively. Also, the end tag End of the delay data set DDS2 is read, and the Addr for the delay data set DDS1 is loaded in the Next DP register. A transmission of the waveform signals 216 is then made with the delay profile specified by the delay values Delay4, Delay5, and Delay6. For the following waveform signal 216 transmission, the Addr for the delay data set DDS1 is automatically transferred in FIG. 7C from the Next DP register to the delay pointer 240. Responsive thereto, FIG. 7D shows that the delay values Delay1, Delay2, and Delay3 of the delay data set DDS1 are read from the shared delay set area 232 and loaded into the delay registers 244a, 244b, and 244c, respectively. Also, the end tag End of the delay data set DDS1 is read, and the Addr for the delay data set DDS3 is loaded in the Next DP register. A transmission of the waveform signals 216 is then made with the delay profile specified by the delay values Delay1, Delay2, and Delay3. Following waveform signal 216 transmission, the Addr for the delay data set DDS3 is automatically transferred in FIG. 7E from the Next DP register to the delay pointer 240. Responsive thereto, FIG. 7F shows that the delay values Delay7, Delay8, and Delay9 of the delay data set DDS3 are read from the shared delay set area 232 and loaded into the delay registers 244a, 244b, and 244c, respectively. A transmission of the waveform signals 216 is then made with the delay profile specified by the delay values Delay7, Delay8, and Delay9.

FIGS. 8A-8F illustrate a flow of processing steps for an example implementation of the auto-loading functionality for the signal pointer. In this example, a simplification is shown using only three channels 225, and three buffer memory areas 256a, 256b, and 256c. The shared waveform set area 230 stores three waveform data sets WDS1, WDS2, and WDS3. Each waveform data set includes a sequence of coded waveform values specifying the shape of a waveform signals 216 (these code sequences are illustrated pictorially to show the waveform shape). Each waveform data set WDS further includes a last entry with an end tag (End). The end tag End of the waveform data set WDS1 further includes an address Addr for the waveform data set WDS3, and the end tag End of the waveform data set WDS2 further includes an address Addr for the waveform data set WDS1.

Figure 8A:
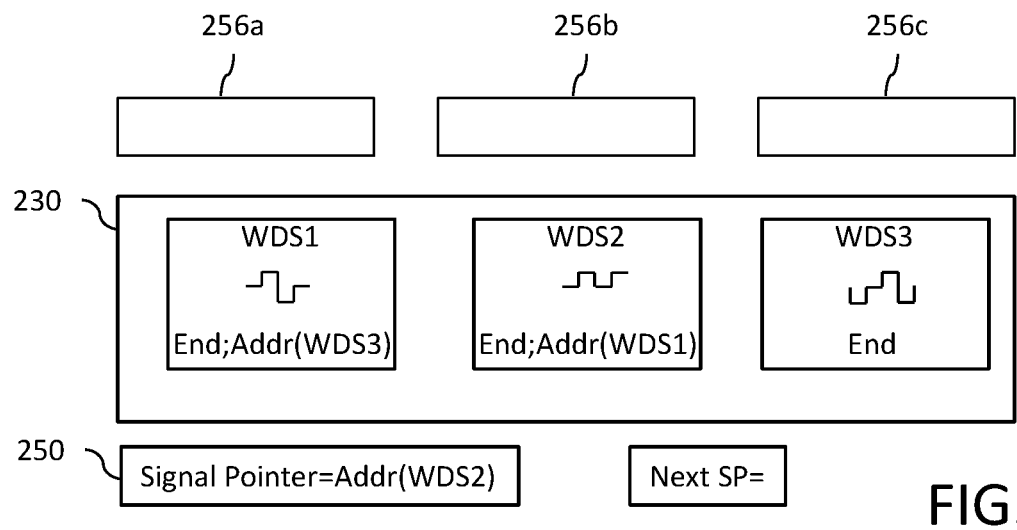
FIGS. 8A-8F illustrate a flow of processing steps for an example implementation of the auto-loading functionality for the signal pointer.
Figure 8B:
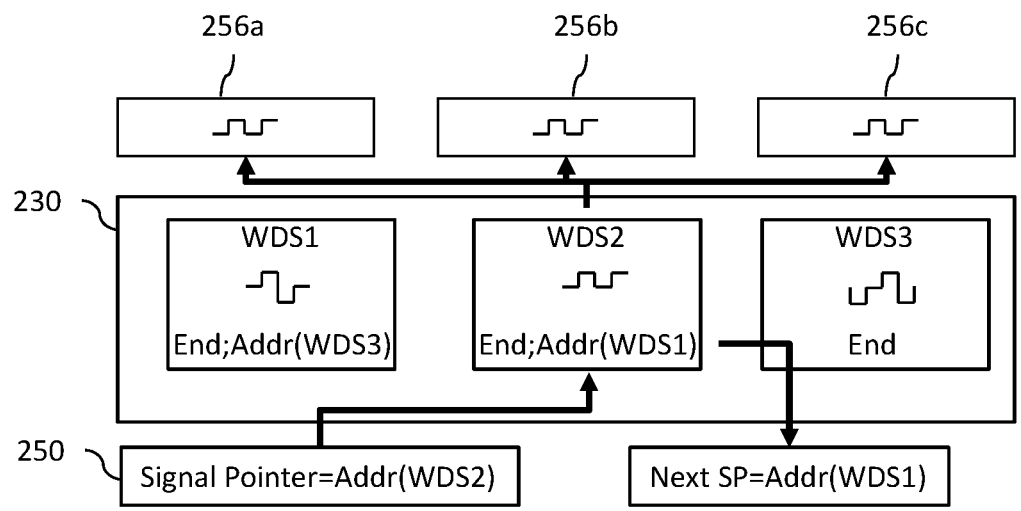
Figure 8C:
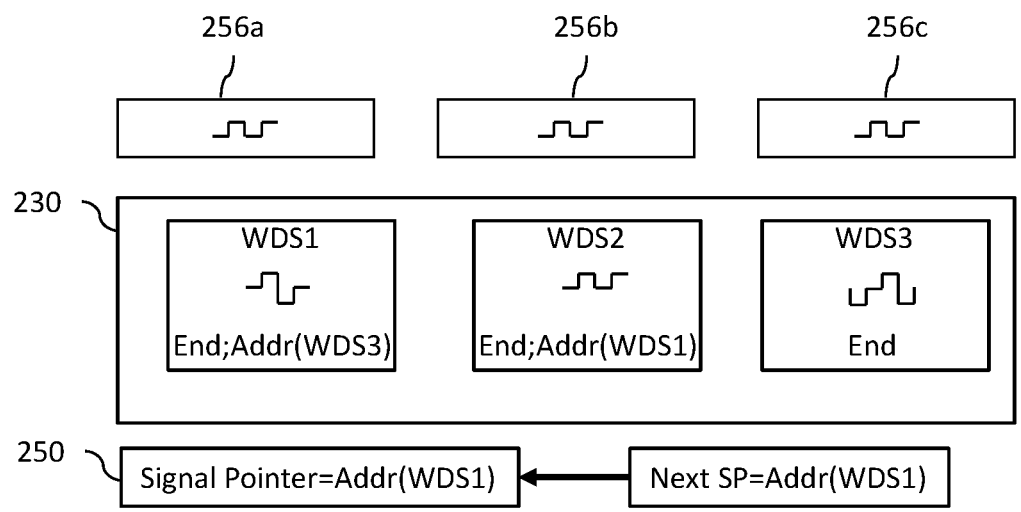
Figure 8D:
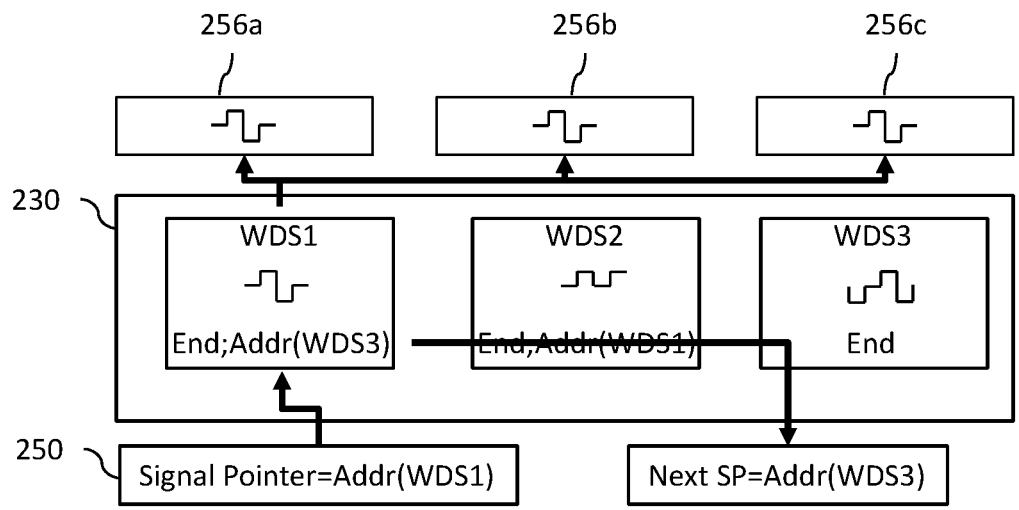
Figure 8E:
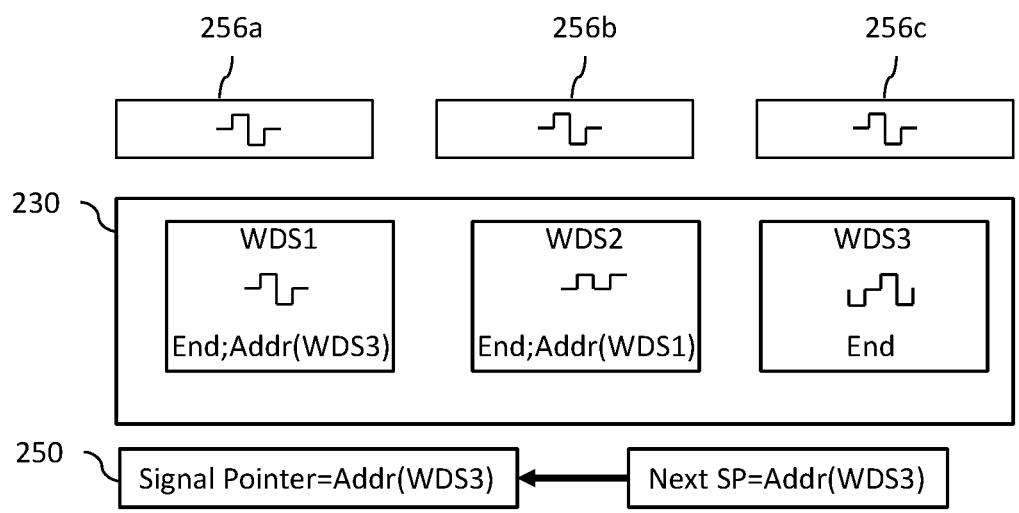
Figure 8F:
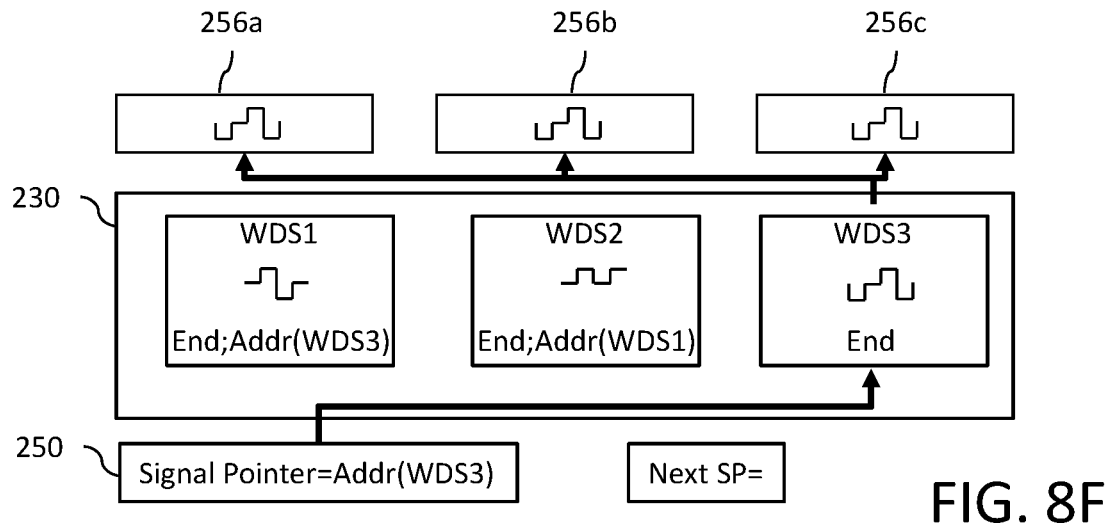

As a starting condition, FIG. 8A shows the signal pointer 250 is loaded with the address in the shared waveform set area 230 of the waveform data set WDS2. Responsive thereto, FIG. 8B shows that the sequence of coded waveform values specifying the shape the waveform signal of the waveform data set WDS2 are read from the shared waveform set area 230 and loaded into the buffer memory areas 256a, 256b, and 256c. As previously discussed, this loading operation can be made subject to the mask vector signal. Also, the end tag End of the waveform data set WDS2 is read, and the Addr for the waveform data set WDS1 is loaded in the Next SP register. A transmission of the waveform signals 216 having the shape specified by the waveform data set WDS2 is then made. It will be noted that the timing of transmission of these waveform signals may be made in accordance with the delay profile specified by the stored delay values in the delay registers 244a, 244b, and 244c, respectively (see, FIG. 7B). For the following waveform signal 216 transmission, the Addr for the waveform data set WDS1 is automatically transferred in FIG. 8C from the Next SP register to the signal pointer 250. Responsive thereto, FIG. 8D shows that the sequence of coded waveform values specifying the shape the waveform signal of the waveform data set WDS1 are read from the shared waveform set area 230 and loaded into the buffer memory areas 256a, 256b, and 256c. Again, this loading operation can be made subject to the mask vector signal. Also, the end tag End of the waveform data set WDS1 is read, and the Addr for the waveform data set WDS3 is loaded in the Next SP register. A transmission of the waveform signals 216 having the shape specified by the waveform data set WDS1 is then made. It will be noted that the timing of transmission of these waveform signals may be made in accordance with the delay profile specified by the stored delay values in the delay registers 244a, 244b, and 244c, respectively (see, FIG. 7D). Following waveform signal 216 transmission, the Addr for the waveform data set WDS3 is automatically transferred in FIG. 8E from the Next SP register to the signal pointer 250. Responsive thereto, FIG. 8F shows that the sequence of coded waveform values specifying the shape the waveform signal of the waveform data set WDS3 are read from the shared waveform set area 230 and loaded into the buffer memory areas 256a, 256b, and 256c. Again, this loading operation can be made subject to the mask vector signal. A transmission of the waveform signals 216 having the shape specified by the waveform data set WDS3 is then made. It will be noted that the timing of transmission of these waveform signals may be made in accordance with the delay profile specified by the stored delay values in the delay registers 244a, 244b, and 244c, respectively (see, FIG. 7F).

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A waveform generator, comprising:
   a plurality of signal channels;
   a memory including:
      a delay area including a plurality of rows, wherein each row is configured to store a delay data set with a digital delay value for each signal channel;
      a shared area configured to store a plurality of waveform data sets, each waveform data set comprising a sequence of coded waveform values specifying waveform step states; and
      an active area including a buffer for each signal channel, each buffer configured to store a selected waveform data set;
   a signal decode circuit coupled to the buffer for each signal channel, wherein said signal decode circuit is configured to decode the coded waveform values of the waveform data set in the buffer and generate a waveform signal on the signal channel having the waveform step states;
a delay control circuit configured to control the signal decode circuits to generate the waveform signals with a delay profile specified by the digital delay values of a selected delay data set;
wherein said memory further comprises:
a delay pointer configured to address a selected row of said delay area of the memory to read the selected delay data set from the memory; and
a signal pointer configured to address said shared area of the memory to read the selected waveform data set from the memory.

2. The generator of claim 1, wherein said signal decode circuit includes a signal driver configured to generate signal levels for the waveform step states.

3. The generator of claim 1, wherein each delay data set further comprises an end value having an end code indicating an end of the digital delay values and an address, and further including a next delay pointer register that is automatically loaded with said address, wherein said address identifies a location in the shared area of the memory where a next delay data set is located.

4. The generator of claim 3, wherein said address is loaded into the delay pointer following generation of the waveform signal.

5. The generator of claim 1, further comprising a circuit configured to load the selected waveform data set from the shared area into each buffer of the active area of the memory.

6. The generator of claim 5, wherein the circuit comprises a mask vector circuit configured to selectively load the selected waveform data set into one or more of the buffers in the active area of the memory in accordance with a mask signal.

7. The generator of claim 1, wherein said delay control circuit comprises:
a delay register for each signal channel, each delay register configured to store the digital delay value in accordance with the delay profile;
a counter configured to generate an incrementing count value;
a comparison circuit configured to compare each digital delay value to the incrementing count value and generate a transmission control pulse for each signal channel when the comparison is satisfied, said transmission control pulse configured to trigger the signal decode circuit to generate the waveform signal.

8. A system, comprising:
the waveform generator of claim 1;
wherein said signal decode circuit includes a signal driver configured to generate signal levels for the waveform step states for the waveform signal; and
a transducer for each signal channel driven in response to the waveform signal.

9. The system of claim 8, wherein the system is a transmitter for an ultrasound imaging system.

10. The system of claim 8, wherein each signal decoder circuit includes a driver circuit configured to level shift signal levels of the waveform signal for application to the transducer.

11. A waveform generator, comprising:
a plurality of signal channels;
a memory including:
a delay area configured to store a plurality of delay data sets, the delay area including a plurality of rows, wherein each row is configured to store a delay data set among the plurality of delay data sets with a digital delay value for each signal channel;
a shared waveform area configured to store a plurality of waveform data sets, each waveform data set comprising a sequence of coded waveform values specifying waveform step states; and
an active area including a buffer for each signal channel, each buffer configured to store a selected waveform data set among the plurality of waveform data sets;
a signal decode circuit coupled to the buffer for each signal channel, wherein said signal decode circuit is configured to decode the coded waveform values of the waveform data set in the buffer and generate a waveform signal on the signal channel having the waveform step states;
a delay control circuit comprising a delay register for each signal channel, a counter configured to generate an increment count value and a comparison circuit;
wherein said memory further comprises:
a delay pointer configured to address a selected row of said delay area of the memory to read the selected delay data set from the memory; and
a signal pointer configured to address said shared area of the memory to read the selected waveform data set from the memory;
wherein each delay register is configured to store the digital delay value in accordance with a delay profile specified by the digital delay value of the selected delay data set; and
wherein the comparison circuit is configured to compare each digital delay value to the incrementing count value and generate a transmission control pulse for each signal channel when the comparison is satisfied, said transmission control pulse being configured to trigger the signal decode circuit to generate the waveform signal with said delay profile.

12. The generator of claim 11, wherein the signal decode circuit includes a driver circuit configured to generate signal levels for the waveform step states.

13. The generator of claim 11, wherein each delay data set further comprises an end value having an end code indicating an end of the digital delay values and an address, and further including a next delay pointer register that is automatically loaded with said address, wherein said address identifies a location in the shared area of the memory where a next delay data set is located.

14. The generator of claim 13, wherein said address is loaded into the delay pointer following generation of the waveform signal.

15. The generator of claim 11, wherein each waveform data set further comprises an end value having an end code indicating an end of the sequence of coded waveform values and an address, and further including a next signal pointer register that is automatically loaded with said address, wherein said address identifies a location in the shared area of the memory where a next waveform data set is located.

16. The generator of claim 15, further comprising a circuit configured to load the selected waveform data set from the shared area into each buffer of the active area of the memory.

17. The generator of claim 16, wherein said circuit comprises a mask vector circuit configured to selectively load the selected waveform data set into one or more of the buffers in the active area of the memory in accordance with a mask signal.

18. A system, comprising:
the waveform generator of claim 11;
wherein said signal decode circuit includes a signal driver configured to generate signal levels for the waveform step states for the waveform signal; and
a transducer for each signal channel driven in response to the waveform signal.

19. The system of claim 18, wherein the system is a transmitter for an ultrasound imaging system.

20. The system of claim 18, wherein each signal decoder circuit includes a driver circuit configured to level shift signal levels of the waveform signal for application to the transducer.

\* \* \* \* \*